United States Patent
Takahashi et al.

(10) Patent No.: US 12,116,643 B2
(45) Date of Patent: Oct. 15, 2024

(54) FORMATION METHOD FOR SLAG FLOW, PRODUCTION METHOD FOR ORGANIC COMPOUND, PRODUCTION METHOD FOR PARTICLES, AND EXTRACTION METHOD

(71) Applicant: FUJIFILM CORPORATION, Tokyo (JP)

(72) Inventors: Kazunori Takahashi, Kanagawa (JP); Takeshi Unemura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 355 days.

(21) Appl. No.: 17/666,590

(22) Filed: Feb. 8, 2022

(65) Prior Publication Data
US 2022/0162716 A1    May 26, 2022

Related U.S. Application Data

(63) Continuation of application No. PCT/JP2020/024391, filed on Jun. 22, 2020.

(30) Foreign Application Priority Data

Sep. 24, 2019    (JP) .................................. 2019-173323

(51) Int. Cl.
  *C21B 3/08*    (2006.01)
  *B01D 11/04*   (2006.01)
  *B03B 9/04*    (2006.01)

(52) U.S. Cl.
  CPC ............ *C21B 3/08* (2013.01); *B01D 11/0488* (2013.01); *B01D 11/0492* (2013.01); *B03B 9/04* (2013.01)

(58) Field of Classification Search
  CPC ... C21B 3/08; B01D 11/0488; B01D 11/0492; B01D 11/0496; B01D 11/04; B03B 9/04;
  (Continued)

(56) References Cited

U.S. PATENT DOCUMENTS

| 6,822,128 B2 * | 11/2004 | Letourneur | .......... B01J 19/2485 |
| | | | 564/395 |
| 2005/0272159 A1 * | 12/2005 | Ismagilov | ......... B01L 3/502746 |
| | | | 436/34 |

(Continued)

FOREIGN PATENT DOCUMENTS

| CN | 103608102 A   * | 2/2014 | .......... B01F 13/1016 |
| FR | 2907030 A1 | 4/2008 | |

(Continued)

OTHER PUBLICATIONS

English translation of Patent Publication CN 103608102A, published Feb. 26, 2014. (Year: 2014).*

(Continued)

*Primary Examiner* — Joseph W Drodge
(74) *Attorney, Agent, or Firm* — SOLARIS Intellectual Property Group, PLLC

(57) ABSTRACT

The present disclosure provides a formation method for a slug flow that includes combining a first liquid and a second liquid that is not compatible with the first liquid, moving the second liquid that is combined with the first liquid to an upstream side with respect to a combination point of the first liquid and the second liquid in a flow direction of the first liquid, and moving, by the first liquid, the second liquid that is retained on the upstream side with respect to the combination point of the first liquid and the second liquid in the flow direction of the first liquid, to a downstream side with respect to the combination point of the first liquid and the second liquid in the flow direction of the first liquid, where a density D1 of the first liquid and a density D2 of the second liquid satisfy a relationship of D1>D2, and provides an application thereof.

15 Claims, 6 Drawing Sheets

(58) Field of Classification Search
CPC ....... B01J 2/00; B01J 19/00; B01J 4/00; B01J 4/001; B01J 8/0015; B01J 8/003; B01J 8/0278; B01J 19/0093; B01J 2219/00891; B01J 2219/00896; B01J 2219/00903; B01J 2219/0869; B01J 2219/0877; B01J 2219/0888; G01N 35/08; B01F 23/40; B01F 23/405; B01F 23/45; B01F 33/30; B01F 33/301; B01F 33/302; B01L 2200/0673

See application file for complete search history.

(56) References Cited

U.S. PATENT DOCUMENTS

| | | | |
|---|---|---|---|
| 2007/0077185 | A1 | 4/2007 | Ueyama et al. |
| 2007/0110631 | A1* | 5/2007 | Ajdari ............... B01L 3/502784 422/504 |
| 2010/0125106 | A1* | 5/2010 | Katsuhara ............... B01F 33/81 516/53 |
| 2015/0125865 | A1 | 5/2015 | Johnson et al. |
| 2019/0060904 | A1* | 2/2019 | Bharadwaj ........ B01F 25/31422 |

FOREIGN PATENT DOCUMENTS

| | | |
|---|---|---|
| JP | H08-173703 A | 7/1996 |
| JP | 2007-098223 A | 4/2007 |
| JP | 2007-303659 A | 11/2007 |
| JP | 4015188 A1 * 11/2007 | ............. B01D 11/04 |
| JP | 2009-220041 A | 10/2009 |
| JP | 2018-111087 A | 7/2018 |
| RU | 2683108 C1 * 3/2019 | |

OTHER PUBLICATIONS

English translation of Patent Publication RU 26 83108C1, published Mar. 26, 2019. (Year: 2019).*
English translation of publication JP-4015188-B2, published Nov. 28, 2007. (Year: 2007).*
International Search Report issued in International Application No. PCT/JP2020/024391 on Aug. 18, 2020.
Written Opinion of the ISA issued in International Application No. PCT/JP2020/024391 on Aug. 18, 2020.

* cited by examiner

FORMATION METHOD FOR SLAG FLOW, PRODUCTION METHOD FOR ORGANIC COMPOUND, PRODUCTION METHOD FOR PARTICLES, AND EXTRACTION METHOD

CROSS-REFERENCE TO RELATED APPLICATIONS

This application is a continuation application of International Application No. PCT/JP2020/024391, filed Jun. 22, 2020, the disclosure of which is incorporated herein by reference in its entirety. Further, this application claims priority from Japanese Patent Application No. 2019-173323, filed Sep. 24, 2019, the disclosure of which is incorporated herein by reference in its entirety.

BACKGROUND OF THE INVENTION

1. Field of the Invention

The present disclosure relates to a formation method for a slug flow, a production method for an organic compound, a production method for particles, and an extraction method.

2. Description of the Related Art

A slug flow, which exhibits a flow aspect in which two phases separated from each other in the inside of a pipe line flow alternately, is expected to be applied to, for example, an organic synthesis reaction (for example, polymerization) and an extraction method. Various techniques have been proposed to form the slug flow.

For example, JP2009-220041A discloses a microreactor in which a plurality of fluids that are not miscible with each other are individually combined into one place through a plurality of inflow flow channels and allowed to flow out through a single outflow flow channel, where the microreactor is characterized in that a temporary retention space part is provided in the middle part of the outflow flow channel so that the retention time of each fluid in the temporary retention space part differs depending on the affinity between the inner wall surface of the temporary retention space part and each fluid.

For example, JP2007-303659A discloses a micro solenoid valve formed by having a cylinder which has ports at an intermediate part in the axial direction and both end parts in the axial direction; a plunger which is accommodated inside the cylinder to be reciprocally movable in the axial direction of the cylinder and has a permanent magnet and which selectively closes the ports at both the end parts in the axial direction of the cylinder; an electromagnet which is provided around at least one of both side portions sandwiching the port at the intermediate part in the axial direction of the cylinder; and one or a plurality of passage grooves which are formed on the inner peripheral surface of the cylinder and which extend in the axial direction of the cylinder and communicate with the port at the intermediate part in the axial direction.

SUMMARY OF THE INVENTION

For example, in the microreactor disclosed in JP2009-220041A, a slug flow is formed by allowing an oily fluid and an aqueous fluid to alternately flow out from the outlet of the temporary retention space part that is provided in the middle part of the outflow flow channel. However, in the method of forming a slug flow in the temporary retention space part as described above, a liquid may be easily emulsified due to the shear stress, and the pressure loss may be increased, whereby there is a possibility that the flow rate is limited. As a result, there is a possibility that the slug length (which refers to the length of the phase (division) that constitutes the slug flow, the same applies hereinafter) cannot be easily adjusted.

Further, for example, the micro solenoid valve disclosed in JP2007-303659A has a complicated structure and needs to be driven by electric power, and thus there is a possibility that the pressure resistance may not be sufficient. As a result, there is a possibility that the slug length cannot be easily adjusted.

The present disclosure has been made in consideration of the above circumstances.

One aspect of the present disclosure is to provide a formation method for a slug flow, with which the slug length is capable of being adjusted by a simple method.

Another aspect of the present disclosure is to provide a production method for an organic compound by using the formation method for a slug flow, with which the slug length is capable of being adjusted by a simple method.

Another aspect of the present disclosure is to provide a production method for particles by using the formation method for a slug flow, with which the slug length is capable of being adjusted by a simple method.

Another aspect of the present disclosure is to provide an extraction method using the formation method for a slug flow, with which the slug length is capable of being adjusted by a simple method.

The present disclosure includes the following aspects.

<1> A formation method for a slug flow, comprising:
combining a first liquid and a second liquid that is not compatible with the first liquid;
moving the second liquid that is combined with the first liquid to an upstream side with respect to a combination point of the first liquid and the second liquid in a flow direction of the first liquid; and moving, by the first liquid, the second liquid that is retained on the upstream side with respect to the combination point of the first liquid and the second liquid in the flow direction of the first liquid, to a downstream side with respect to the combination point of the first liquid and the second liquid in the flow direction of the first liquid;
in which a density D1 of the first liquid and a density D2 of the second liquid satisfy a relationship of D1>D2.

<2> The formation method for a slug flow according to <1>, in which at the combination point of the first liquid and the second liquid, an angle θ1 formed by the flow direction of the first liquid that is combined with the second liquid and a direction of gravitational force and an angle θ2 formed by a flow direction of the second liquid that is combined with the first liquid and the direction of gravitational force satisfy a relationship of θ1<θ2.

<3> The formation method for a slug flow according to <1> or <2>, in which at the combination point of the first liquid and the second liquid, an angle θ1 formed by the flow direction of the first liquid that is combined with the second liquid and a direction of gravitational force is 0° or more and less than 90°.

<4> The formation method for a slug flow according to any one of <1> to <3>, further comprising retaining the second liquid that has been moved to the upstream side with respect to the combination point of the first liquid and the second liquid in the flow direction of the first liquid, on the upstream side with respect to the combination point of the first liquid and the second liquid in the flow direction of the first liquid, and arranging the first liquid and the second liquid vertically in the direction of gravitational force.

<5> The formation method for a slug flow according to any one of <1> to <4>, in which the density D1 of the first liquid and the density D2 of the second liquid satisfy a relationship of 5 kg/m³≤D1−D2.

The formation method for a slug flow according to any one of <1> to <5>, in which a flow rate R1 of the first liquid and a flow rate R2 of the second liquid satisfy a relationship of R1>R2 or a relationship of R1<R2.

<7> The formation method for a slug flow according to any one of <1> to <6>, further comprising combining the first liquid and the second liquid at a combination part of a device having a first pipe line through which the first liquid flows, a second pipe line through which the second liquid flows, the combination part at which the first pipe line and the second pipe line communicate with each other and the first liquid and the second liquid are combined, and a third pipe line which is connected to the combination part and through which the combined first liquid and second liquid flow.

<8> The formation method for a slug flow according to <7>, further comprising retaining the second liquid at a retention part that is located inside the first pipe line and retains the second liquid that has been moved to the upstream side with respect to the combination point of the first liquid and the second liquid in the flow direction of the first liquid.

The formation method for a slug flow according to <8>, in which the retention part is a reduced diameter part of which an inner diameter is reduced from the downstream side toward the upstream side in the flow direction of the first liquid.

<10> The formation method for a slug flow according to <8>, in which the retention part a reduced diameter part of which an inner diameter is reduced from the downstream side toward the upstream side in the flow direction of the first liquid and which is configured to adjust a distance L1 from a center of the combination part to the retention part.

<11> The formation method for a slug flow according to <8>, in which the retention part is an end part of a pipe line that is inserted into the first pipe line on the upstream side with respect to the combination point of the first liquid and the second liquid in the flow direction of the first liquid and has an inner diameter smaller than an inner diameter of the first pipe line.

<12> The formation method for a slug flow according to <8>, in which the retention part is a constricted part having a partially reduced inner diameter.

<13> The formation method for a slug flow according to <8>, in which the retention part is a mesh-shaped member.

<14> The formation method for a slug flow according to any one of <8> to <13>, in which a distance L1 from a center of the combination part to the retention part is 1 mm or more.

<15> The formation method for a slug flow according to any one of <8> to <14>, in which a distance L1 from a center of the combination part to the retention part and an inner diameter L2 of the first pipe line satisfy a relationship of L1>L2.

<16> The formation method for a slug flow according to any one of <1> to <15>, in which the formation method is used in an organic synthesis reaction.

<17> The formation method for a slug flow according to any one of <1> to <15>, in which the formation method is used in a particle formation reaction.

<18> The formation method for a slug flow according to any one of <1> to <15>, in which the formation method is used in an extraction method.

<19> A production method for an organic compound, comprising the formation method for a slug flow according to any one of <1> to <15>.

<20> A production method for particles, comprising the formation method for a slug flow according to any one of <1> to <15>.

<21> An extraction method comprising the formation method for a slug flow according to any one of <1> to <15>.

According to one aspect of the present disclosure, there is provided a formation method for a slug flow, with which the slug length is capable of being adjusted by a simple method.

According to another aspect of the present disclosure, there is provided a production method for an organic compound by using the formation method for a slug flow, with which the slug length is capable of being adjusted by a simple method.

According to another aspect of the present disclosure, there is provided a production method for particles by using the formation method for a slug flow, with which the slug length is capable of being adjusted by a simple method.

According to another aspect of the present disclosure, there is provided an extraction method using the formation method for a slug flow, with which the slug length is capable of being adjusted by a simple method.

DESCRIPTION OF THE PREFERRED EMBODIMENTS

Figure 1:
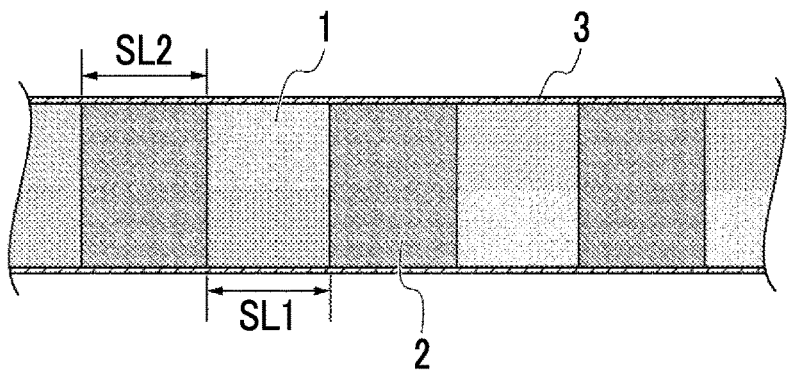
FIG. 1 is a schematic view illustrating an example of a flow aspect of a slug flow that is formed by a formation method for a slug flow according to the present disclosure.

Hereinafter, embodiments of the present disclosure will be described in detail. The present disclosure is not limited in any way to the following embodiments and may be implemented with appropriate modifications within the scope of the purpose of the present disclosure. In a case where the embodiments of the present disclosure are described with reference to the drawings, the description of constitutional elements and reference numerals that are overlapped in the drawings may be omitted. The constitutional elements indicated by the same reference numerals in the drawings mean the same constitutional elements. The dimensional ratio in the drawings does not necessarily indicate the actual dimensional ratio.

In the present disclosure, a range of numerical values described using "to" means a range including the numerical values listed before and after "to" as the lower limit and the upper limit. Regarding numerical ranges that are described stepwise in the present disclosure, an upper limit value or a lower limit value described in a numerical value may be replaced with an upper limit value or a lower limit value of another stepwise numerical range. In addition, regarding a numerical range described in the present disclosure, an upper limit value or a lower limit value described in a numerical value may be replaced with a value described in Examples.

In the present disclosure, the amount of each component in a composition means, in a case where the composition contains a plurality of substances corresponding to such a component, the total amount of the plurality of substances in the composition, unless otherwise specified.

In the present disclosure, a combination of two or more preferred aspects is a more preferred aspect.

In the present disclosure, "% by mass" and "% by weight" are synonymous, and "parts by mass" and "parts by weight" are synonymous.

In the present disclosure, the ordinal numbers (for example, "first" and "second") are terms that are used to distinguish constitutional elements, and thus they do not limit the number of constitutional elements and the superiority or inferiority of the constitutional elements.

<Formation Method for Slug Flow>

A formation method for a slug flow according to the present disclosure includes (1) combining a first liquid and a second liquid that is not compatible with the first liquid (hereinafter, may be referred to as a "step (A)", (2) moving the second liquid that is combined with the first liquid to an upstream side with respect to a combination point of the first liquid and the second liquid in a flow direction of the first liquid (hereinafter, may be referred to as a "step (B)", and (3) moving, by the first liquid, the second liquid that is retained on the upstream side with respect to the combination point of the first liquid and the second liquid in the flow direction of the first liquid, to a downstream side with respect to the combination point of the first liquid and the second liquid in the flow direction of the first liquid (hereinafter, may be referred to as a "step (C)", where a density D1 of the first liquid and a density D2 of the second liquid satisfy a relationship of D1>D2. In the present disclosure, the "combination point of the first liquid and the second liquid" means a point at which the first liquid and the second liquid are combined, and it specifically means an intersection of the center line of the first liquid in the flow direction and the center line of the second liquid in the flow direction. From one viewpoint, the combination point of the first liquid and the second liquid is an intersection of a line that passes through the center of the flow channel of the first liquid and a line that passes through the center of the flow channel of the second liquid.

According to the formation method for a slug flow according to the present disclosure, it is possible to adjust the slug length by a simple method in a case where the formation method includes the above configuration. The reason why the formation method for a slug flow according to the present disclosure exhibits the above-described effect is not clear; however, it is presumed as follows. As described above, for example, in the formation method for a slug flow using the technique disclosed in JP2009-220041A or JP2007-303659A, there is a possibility that the control of the slug length is greatly restricted depending on the conditions and the device. As compared with the formation method for a slug flow in the related art, in the formation method for a slug flow according to the present disclosure, a slug flow can be formed through the following process; (1) combining a first liquid and a second liquid that is not compatible with the first liquid (the density D2 of the second liquid is smaller than the density D1 of the first liquid)", (2) moving the second liquid that is combined with the first liquid to an upstream side with respect to a combination point of the first liquid and the second liquid in a flow direction of the first liquid, and (3) moving, by the first liquid, the second liquid that is retained on the upstream side with respect to the combination point of the first liquid and the second liquid in the flow direction of the first liquid, to a downstream side with respect to the combination point of the first liquid and the second liquid in the flow direction of the first liquid. That is, the second liquid that is combined with the first liquid is moved to an upstream side with respect to a combination point of the first liquid and the second liquid in a flow direction of the first liquid, and then the second liquid that has been moved to the upstream side in the flow direction of the first liquid is moved to the downstream side of the first liquid in the flow direction so that it is pushed back by the first liquid. Further, in a case where the density D1 of the first liquid and the density D2 of the second liquid satisfy a relationship of D1>D2, the second liquid combined with the first liquid can exert such behavior that it rises in the first liquid. For example, in a case where the behavior that the second liquid rises in the first liquid due to the density difference, the second liquid that is combined with the first liquid can be easily moved to an upstream side with respect to a combination point of the first liquid and the second liquid in a flow direction of the first liquid. As a result, according to the formation method for a slug flow according to the present disclosure, since the slug length can be adjusted depending on the amount (which includes the amount of the second liquid that has been retained on the upstream side with respect to the combination point of the first liquid and the second liquid in the flow direction of the first liquid) of the second liquid that has been moved to the upstream side with respect to the combination point of the first liquid and the second liquid in the flow direction of the first liquid, the slug length is capable of being adjusted by a simpler method as compared with the formation method for a slug flow in the related art.

The slug flow that is formed by the formation method for a slug flow according to the present disclosure exhibits a flow aspect in which two phases (that is, a phase containing a first liquid and a phase containing a second liquid) separated from each other flow alternately. Here, the flow aspect of the slug flow will be described with reference to FIG. 1. FIG. 1 is a schematic view illustrating an example of a flow aspect of a slug flow that is formed by a formation method for a slug flow according to the present disclosure.

As illustrated in FIG. 1, the slug flow exhibits a flow aspect in which a first liquid 1 and a second liquid 2, phases of which are separated from each other in the inside of a pipe line 3, flow alternately. In FIG. 1, SL1 indicates a slug length of the first liquid 1. In FIG. 1, SL2 indicates a slug length of the second liquid 2.

<<Step (A)>>

In the step (A), a first liquid and a second liquid that is not compatible with the first liquid are combined. In the present disclosure, "not compatible" means the property that a plurality of liquids separate (that is, undergo phase separation) without mixing with each other (hereinafter, may be referred to as "incompatible").

[First Liquid]

The density D1 of the first liquid is larger than the density D2 of the second liquid. That is, the density D1 of the first liquid and the density D2 of the second liquid satisfy a relationship of D1>D2. In a case where the density D1 of the first liquid and the density D2 of the second liquid satisfy a relationship of D1>D2, the second liquid that is combined with the first liquid can be easily moved in the step (B) to an upstream side with respect to a combination point of the first liquid and the second liquid in a flow direction of the first liquid. In a case where the movement of the second liquid in the step (B) is facilitated, the controllability of the slug length can be improved. In the present disclosure, the "the density of liquid" means a ratio ([mass of liquid]/[volume of liquid]) of the mass of a liquid to the volume of the liquid at a temperature of 25° C. and standard air pressure (specifically, 1013.25 hPa).

The density D1 of the first liquid is not limited as long as it is a value larger than the density D2 of the second liquid. The density D1 of the first liquid is preferably 100 kg/m$^3$ to 2,000 kg/m$^3$, more preferably 500 kg/m$^3$ to 2,000 kg/m$^3$, and particularly preferably 800 kg/m$^3$ to 1,000 kg/m$^3$, from the viewpoint of controllability of the slug length.

The viscosity of the first liquid is not limited. From the viewpoint of controllability of the slug length, the viscosity of the first liquid is preferably 0.1 mPa's to 100 mPa·s, more preferably 0.1 mPa·s to 50 mPa's, and particularly preferably 1 mPa's to 10 mPa·s.

The temperature of the first liquid is not limited. The temperature of the first liquid may be determined, for example, in the range equal to or lower than the boiling point of the first liquid. In a case where the boiling point of the first liquid is higher than the boiling point of the second liquid, the temperature of the first liquid is preferably in the range equal to or lower than the boiling point of the second liquid. The lower limit of the temperature of the first liquid is not limited as long as the first liquid exhibits fluidity. The temperature of the first liquid may be determined, for example, in a range of 15° C. or higher (preferably 20° C. or higher). For example, in a case where the first liquid is water, the temperature of the first liquid may be determined in a range of 15° C. to 100° C.

The composition of the first liquid is not limited, and it may be determined depending on the incompatibility with the second liquid and the density of the second liquid (that is, the range in which the density of the first liquid is larger than the density of the second liquid). The first liquid may be a pure substance or a mixture (for example, a solution).

Examples of the first liquid include fluorine oil and water. The first liquid preferably contains fluorine oil or water, and more preferably water, from the viewpoint of incompatibility with the second liquid.

Examples of the fluorine oil include a hydrofluoroether and a perfluoropolyether oil. Examples of the commercially available fluorine oil product include Novec (3M Company).

In a case where the first liquid contains fluorine oil or water, the content of the fluorine oil or water in the first liquid is not limited and may be determined depending on the incompatibility with the second liquid and the target density. The content of the fluorine oil or water in the first liquid may be determined, for example, in a range of 90% by mass to 100% by mass with respect to the total mass of the first liquid.

In a case where the first liquid is a solution or a dispersion system, the content of the solvent or dispersion medium in the first liquid is not limited and may be determined depending on the purpose. The content of the solvent or dispersion medium in the first liquid may be determined in a range of, for example, 80% by mass to 99.9% by mass with respect to the total mass of the first liquid.

The first liquid may contain a compound as a solute. Examples of the compound include a polymerization initiator, an emulsifying agent, and a monomer.

In a case where the first liquid contains a compound as a solute, the content of the compound in the first liquid is not limited and may be determined depending on the purpose. For example, in a case where emulsion polymerization is carried out using the formation method for a slug flow according to the present disclosure, the content of the compound in the first liquid may be determined in a range of 0.1% by mass to 10% by mass with respect to the total mass of the first liquid.

[Second Liquid]

The density D2 of the second liquid is not limited as long as it is smaller than the density D1 of the first liquid. The density D2 of the second liquid is preferably 100 kg/m$^3$ to 2,000 kg/m$^3$, more preferably 500 kg/m$^3$ to 2,000 kg/m$^3$, and particularly preferably 800 kg/m$^3$ to 1,000 kg/m$^3$, from the viewpoint of controllability of the slug length.

The density D1 of the first liquid and the density D2 of the second liquid preferably satisfy a relationship of 5 kg/m$^3$≤D1−D2, more preferably satisfy a relationship of 40 kg/m$^3$≤D1−D2, and particularly preferably satisfy a relationship of 80 kg/m$^3$≤D1−D2, from the viewpoint of controllability of the slug length. The upper limit of "D1−D2" is not limited. The density D1 of the first liquid and the density D2 of the second liquid preferably satisfy a relationship of D1-D2≤500 kg/m$^3$, more preferably satisfy a relationship of D1-D2≤250 kg/m$^3$, and particularly preferably satisfy a relationship of D1−D2≤100 kg/m$^3$. The density D1 of the first liquid and the density D2 of the second liquid may satisfy a relationship of D1−D2≤5 kg/m$^3$ or a relationship of D1−D2≤10 kg/m$^3$.

The viscosity of the second liquid is not limited. From the viewpoint of controllability of the slug length, the viscosity of the second liquid is preferably 0.1 mPa's to 100 mPa·s, more preferably 1 mPa's to 50 mPa's, and particularly preferably 1 mPa's to 10 mPa·s.

The temperature of the second liquid is not limited. The temperature of the second liquid may be determined, for example, in the range equal to or lower than the boiling point of the second liquid. In a case where the boiling point of the second liquid is higher than the boiling point of the first liquid, the temperature of the second liquid is preferably in the range equal to or lower than the boiling point of the first liquid. The lower limit of the temperature of the second liquid is not limited as long as the second liquid exhibits fluidity. The temperature of the second liquid may be determined, for example, in a range of 15° C. or higher (preferably 20° C. or higher). For example, in a case where the second liquid is styrene, the temperature of the second liquid may be determined in a range of 15° C. to 145° C.

The composition of the second liquid is not limited, and it may be determined depending on the incompatibility with the first liquid and the density of the first liquid (that is, the range in which the density of the second liquid is smaller than the density of the first liquid). The second liquid may be a pure substance or a mixture (for example, a solution).

Examples of the second liquid include a hydrocarbon, silicone oil, fatty oil, water, an ether, and fluorine oil.

Examples of the hydrocarbon include a saturated hydrocarbon, an unsaturated hydrocarbon, an alicyclic hydrocarbon, and an aromatic hydrocarbon. Specific examples of the hydrocarbon include styrene, toluene, dodecane, and cyclohexane.

Examples of the silicone oil include a dimethyl silicone oil, a methyl phenyl silicone oil, and a modified silicone oil. Commercially available silicone oil is, for example, KF-96 (for example, KF-96-0.65CS, KF-96-10CS, and KF-96-100CS) manufactured by Shin-Etsu Chemical Co., Ltd.

Examples of the fatty oil include oleic acid, linolenic acid, and corn oil.

Examples of the ether include dimethyl ether, ethyl methyl ether, diethyl ether, and tetrahydrofuran.

Examples of the fluorine oil include the fluorine oil described in the section of "First liquid" described above.

From the viewpoint of incompatibility with the first liquid, the second liquid preferably contains water or a hydrocarbon, more preferably contains a hydrocarbon, and particularly preferably contains an aromatic hydrocarbon.

In a case where the second liquid is a solution or a dispersion system, the content of the solvent or dispersion medium in the second liquid is not limited and may be determined depending on the purpose. The content of the solvent or dispersion medium in the second liquid may be determined in a range of, for example, 80% by mass to 99.9% by mass with respect to the total mass of the second liquid.

The second liquid may contain a compound as a solute. Examples of the compound include a polymerization initiator, an emulsifying agent, and a monomer.

In a case where the second liquid contains a compound as a solute, the content of the compound in the second liquid is not limited and may be determined depending on the purpose. For example, in a case where emulsion polymerization is carried out using the formation method for a slug flow according to the present disclosure, the content of the compound in the second liquid may be determined in a range of 0.1% by mass to 10% by mass with respect to the total mass of the second liquid.

Method and Conditions

At the combination point of the first liquid and the second liquid, an angle $\theta_1$ formed by the flow direction of the first liquid that is combined with the second liquid and a direction of gravitational force and an angle $\theta_2$ formed by a flow direction of the second liquid that is combined with the first liquid and the direction of gravitational force preferably satisfy a relationship of $\theta_1 < \theta_2$. In a case where $\theta_1$ and $\theta_2$ satisfy a relationship of $\theta_1 < \theta_2$, by using the difference between the density D1 of the first liquid and the density D2 of the second liquid, the second liquid that is combined with the first liquid can be easily moved in the step (B) to an upstream side with respect to a combination point of the first liquid and the second liquid in a flow direction of the first liquid. In a case where the movement of the second liquid in the step (B) is facilitated, the controllability of the slug length can be improved.

Figure 2:
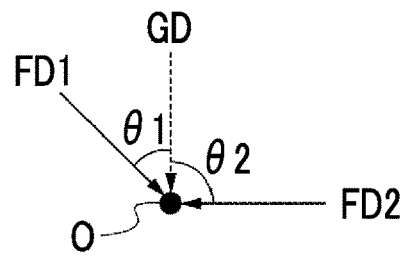
FIG. 2 is a schematic view illustrating an example of an angle formed by a flow direction and a direction of gravitational force.

Here, the angle $\theta_1$ and the angle $\theta_2$ at the combination point of the first liquid and the second liquid will be described with reference to FIG. 2, where the angle $\theta_1$ is formed by the flow direction of the first liquid that is combined with the second liquid and the direction of gravitational force and the angle $\theta_2$ is formed by the flow direction of the second liquid that is combined with the first liquid and the direction of gravitational force. FIG. 2 is a schematic view illustrating an example of an angle formed by a flow direction and a direction of gravitational force.

As illustrated in FIG. 2, the angle $\theta_1$ formed by the flow direction FD1 of the first liquid that is combined with the second liquid (hereinafter, may be simply referred to as the "flow direction FD1") and the direction of gravitational force GD is an angle created by the flow direction FD1 of the first liquid and the direction of gravitational force GD, which cross at the combination point O of the first liquid and the second liquid.

As illustrated in FIG. 2, the angle $\theta_2$ formed by the flow direction FD2 of the second liquid that is combined with the first liquid and the direction of gravitational force GD is an angle created by the flow direction FD2 of the second liquid (hereinafter, may be simply referred to as the "flow direction FD2") and the direction of gravitational force GD, which cross at the combination point O of the first liquid and the second liquid.

At the combination point of the first liquid and the second liquid, the angle $\theta_1$ formed by the flow direction of the first liquid that is combined with the second liquid and the direction of gravitational force is preferably 0° or more and less than 90°, more preferably 0° to 45°, still more preferably 0° to 30°, and particularly preferably 0° to 15°. In a case where $\theta_1$ is in the above range, by using the difference between the density D1 of the first liquid and the density D2 of the second liquid, the second liquid that is combined with the first liquid can be easily moved in the step (B) to an upstream side with respect to a combination point of the first liquid and the second liquid in a flow direction of the first liquid. In a case where the movement of the second liquid in the step (B) is facilitated, the controllability of the slug length can be improved.

The flow rate R1 of the first liquid is not limited. From the viewpoint of productivity, the flow rate R1 of the first liquid is preferably 0.001 mL/min or more, more preferably 0.01 mL/min or more, and particularly preferably 0.1 mL/min or more. From the viewpoint of formation of the stable slug flow, the flow rate R1 of the first liquid is preferably 1,000 mL/min or less, more preferably 500 mL/min or less, and particularly preferably 100 mL/min or less.

The flow rate R2 of the second liquid is not limited. From the viewpoint of productivity, the flow rate R2 of the second liquid is preferably 0.001 mL/min or more, more preferably 0.01 mL/min or more, and particularly preferably 0.1 mL/min or more. From the viewpoint of formation of the stable slug flow, the flow rate R2 of the second liquid is preferably 1,000 mL/min or less, more preferably 500 mL/min or less, and particularly preferably 100 mL/min or less.

The flow rate R1 of the first liquid and the flow rate R2 of the second liquid may be the same or different from each other. The flow rate R1 of the first liquid and the flow rate R2 of the second liquid preferably satisfy a relationship of R1>R2 or R1<R2. In a case where the flow rate R1 of the first liquid and the flow rate R2 of the second liquid satisfy a relationship of R1>R2, it is possible to make the slug length of the phase containing the first liquid longer than the slug length of the phase containing the second liquid. In a case where the flow rate R1 of the first liquid and the flow rate R2 of the second liquid satisfy a relationship of R1<R2, it is possible to make the slug length of the phase containing the second liquid longer than the slug length of the phase containing the first liquid.

In the step (A), the first liquid and the second liquid can be combined, for example, by using a device having the following constitutional elements. In the step (A), it is preferable that the first liquid and the second liquid are combined at a combination part of a device (hereinafter, may be referred to as a "device (A)") having a first pipe line through which the first liquid flows, a second pipe line through which the second liquid flows, the combination part at which the first pipe line and the second pipe line communicate with each other and the first liquid and the second liquid are combined, and a third pipe line which is connected to the combination part and through which the combined first liquid and second liquid flow. Here, the term "combined first liquid and second liquid" includes a slug flow containing the first liquid and the second liquid. Hereinafter, the configuration of the device (A) will be described. However, the configuration of the device (A) is not limited to the following embodiment.

The first pipe line is a pipe line through which the first liquid flows. One end part of the first pipe line communicates with the second pipe line to form a combination part. The first pipe line may communicate with the second pipe line at the combination part in an attachable and detachable manner or an unattachable and undetachable manner. The other end part of the first pipe line may communicate with another member (for example, a supply device that supplies the first liquid, or another pipe line). The term "communicate" in the present disclosure means connecting two or more objects so that a fluid can flow.

Examples of the material of the first pipe line include glass, a resin, and a metal.

The resin is preferably a resin having resistance to a solvent. The resin is preferably an acryl (also referred to as an acrylic resin), a polycarbonate, a polydimethylsiloxane, or a fluororesin, and more preferably a fluororesin. Examples of the fluororesin include polytetrafluoroethylene (PTFE) and a perfluoroalkoxy alkane (PFA).

Examples of the metal include stainless steel.

The cross-sectional shape of the first pipe line is not limited. Examples of the cross-sectional shape of the first pipe line include a perfect circle, an ellipse, and a quadrangle.

The diameter of the first pipe line is not limited. The outer diameter of the first pipe line may be determined, for example, in a range of 1 mm to 100 mm. The inner diameter of the first pipe line may be determined, for example, in a range of 0.1 mm to 50 mm. In the present disclosure, the "inner diameter" means the maximum length of the diameter on the inner side of the cross section of an object unless otherwise specified. In the present disclosure, the "outer diameter" means the maximum length of the diameter on the outer side of the cross section of an object unless otherwise specified.

The second pipe line is a pipe line through which the second liquid flows. One end part of the second pipe line communicates with the first pipe line to form a combination part. The second pipe line may communicate with the first pipe line at the combination part in an attachable and detachable manner or an unattachable and undetachable manner. The other end part of the second pipe line may communicate with another member (for example, a supply device that supplies the second liquid, or another pipe line).

Examples of the material of the second pipe line include the material of the first pipe line described above. The material of the second pipe line may be the same as or different from the material of the first pipe line.

The cross-sectional shape of the second pipe line is not limited. Examples of the cross-sectional shape of the second pipe line include a perfect circle, an ellipse, and a quadrangle. The cross-sectional shape of the second pipe line may be the same as or different from the cross-sectional shape of the first pipe line.

The diameter of the second pipe line is not limited. The outer diameter of the second pipe line may be determined, for example, in a range of 1 mm to 100 mm. The inner diameter of the second pipe line may be determined, for example, in a range of 0.1 mm to 50 mm. The diameter of the second pipe line may be the same as or different from the diameter of the first pipe line.

The combination part is a portion at which the first pipe line and the second pipe line communicate with each other and the first liquid and the second liquid are combined. The structure of the combination part is not limited as long as it is a structure in which the first liquid that flows through the first pipe line and the second liquid that flows through the second pipe line are capable of being combined. That is, it suffices that at the combination part, the first pipe line and the second pipe line are connected so that the liquid can flow. The combination part may be formed by the direct communication of the first pipe line and the second pipe line. Further, the combination part may be formed by the indirect communication of the first pipe line and the second pipe line via another member.

Figure 3:
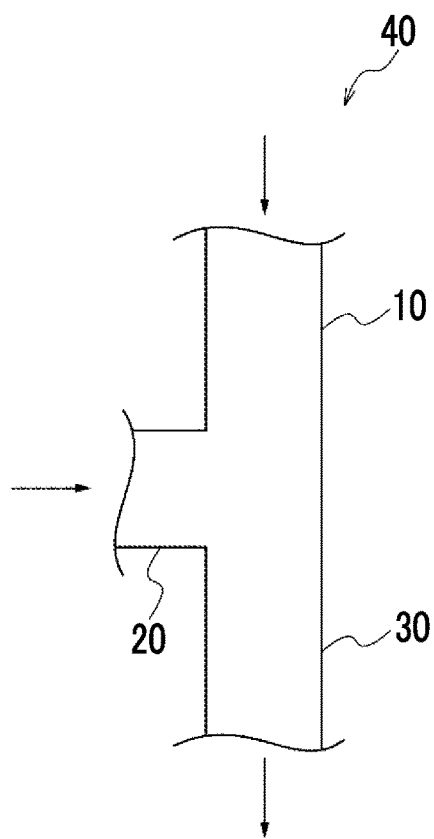
FIG. 3 is a schematic cross-sectional view illustrating an example of a combination part in a device that is used in the formation method for a slug flow according to the present disclosure.

Here, the structure of the combination part will be described with reference to FIG. 3. FIG. 3 is a schematic cross-sectional view illustrating an example of a combination part in a device that is used in the formation method for a slug flow according to the present disclosure.

In a combination part 40 illustrated in FIG. 3, a first pipe line 10 through which the first liquid flows, a second pipe line 20 through which the second liquid flows, and a third pipe line 30 through which the combined first liquid and second liquid (that is, the slug flow) flow communicate with each other. The combination part 40 illustrated in FIG. 3 is integrally formed by connecting the first pipe line 10, the second pipe line 20, and the third pipe line 30 to each other.

In FIG. 3, the first pipe line 10, the second pipe line 20, and the third pipe line 30 are arranged on the same plane. The first pipe line 10 is connected at a right angle to the second pipe line 20 on the same plane. The second pipe line 20 is connected at a right angle to the third pipe line 30 on the same plane.

The third pipe line is a pipe line which is connected to the combination part and through which the combined first liquid and second liquid flow. The third pipe line may be connected to the combination part in an attachable and detachable manner or an unattachable and undetachable manner.

Examples of the material of the third pipe line include the material of the first pipe line described above. The material of the third pipe line may be the same as or different from the material of the first pipe line. The material of the third pipe line may be the same as or different from the material of the second pipe line.

The cross-sectional shape of the third pipe line is not limited. Examples of the cross-sectional shape of the third pipe line include a perfect circle, an ellipse, and a quadrangle. The cross-sectional shape of the third pipe line may be the same as or different from the cross-sectional shape of the first pipe line. The cross-sectional shape of the third pipe line may be the same as or different from the cross-sectional shape of the second pipe line.

The diameter of the third pipe line is not limited. The outer diameter of the third pipe line may be determined, for example, in a range of 1 mm to 100 mm. The inner diameter of the third pipe line may be determined, for example, in a range of 0.1 mm to 50 mm. The diameter of the third pipe line may be the same as or different from the diameter of the first pipe line. The diameter of the third pipe line may be the same as or different from the diameter of the second pipe line.

<<Step (B)>>

Figure 4:
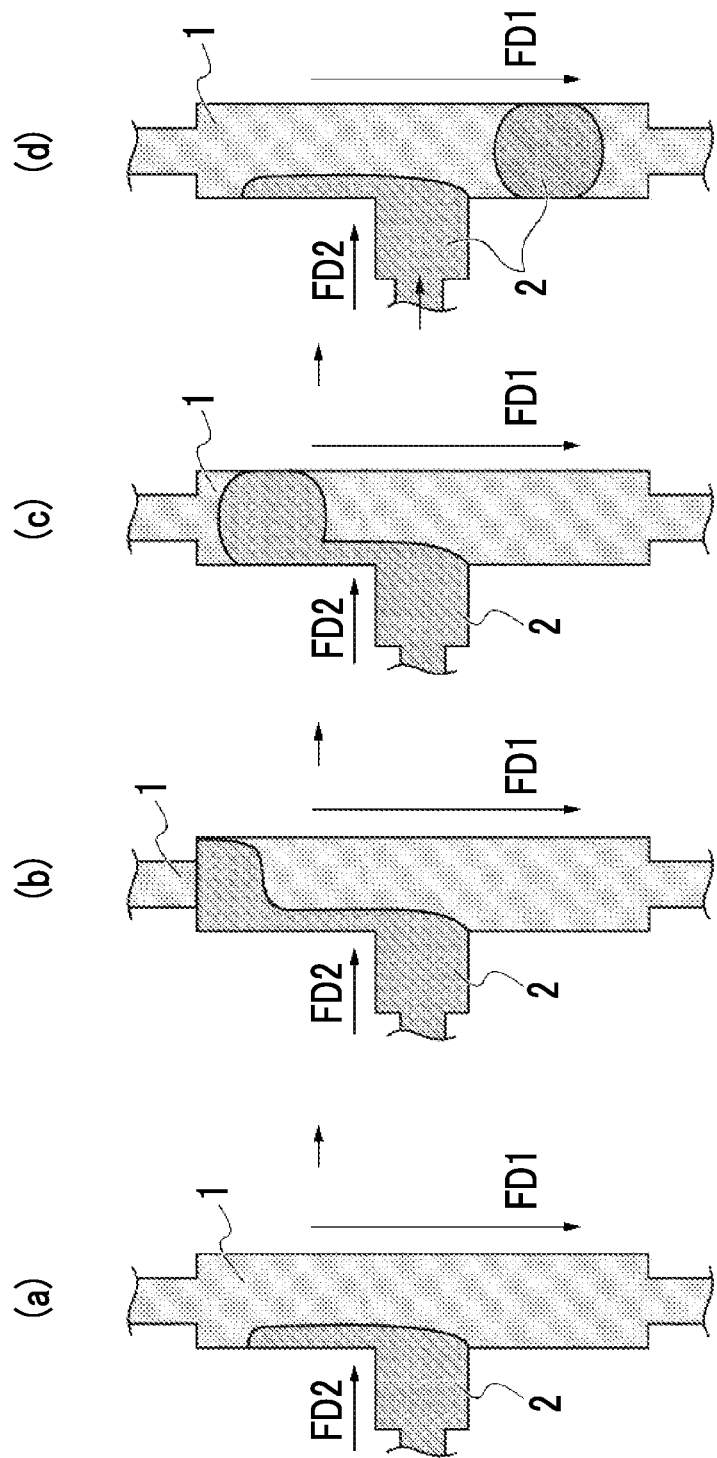
FIG. 4 is a schematic view illustrating an example of a slug flow forming process according to the formation method for a slug flow according to the present disclosure.

In the step (B), the second liquid that is combined with the first liquid is moved to an upstream side with respect to a combination point of the first liquid and the second liquid in a flow direction of the first liquid (see, for example, (a) of FIG. 4 and (b) of FIG. 4). In the step (B), the slug length can be adjusted depending on the amount (which includes the amount of the second liquid that has been retained on the upstream side with respect to the combination point of the first liquid and the second liquid in the flow direction of the first liquid) of the second liquid that is moved to the upstream side with respect to the combination point of the first liquid and the second liquid in the flow direction of the first liquid.

Here, the step (B) will be described with reference to FIG. 4. FIG. 4 is a schematic view illustrating an example of a slug flow forming process according to the formation method for a slug flow according to the present disclosure.

As illustrated in (a) of FIG. 4, the second liquid 2 that flows in the flow direction FD2 is combined with the first liquid 1 that flows in the flow direction FD1.

As illustrated in (a) of FIG. 4, the second liquid 2 that has combined with the first liquid 1 is moved to the upstream side with respect to the combination point of the first liquid 1 and the second liquid 2 in the flow direction FD1 (that is, in the direction opposite to the flow direction FD1). As described above, the second liquid 2 that has combined with the first liquid 1 can be moved to the upstream side in the flow direction FD1 by using, for example, the difference between the density of the first liquid 1 and the density of the second liquid 2 (that is, by using the fact the density of the second liquid 2 is smaller than the density of the first liquid 1).

In the step (B), the amount of the second liquid that is moved to the upstream side with respect to the combination point of the first liquid and the second liquid in the flow direction of the first liquid can be adjusted with, for example, the flow rate R1 of the first liquid and the flow rate R2 of the second liquid. In a case where the flow rate R1 of the first liquid is set to be larger than the flow rate R2 of the second liquid, the amount of the second liquid that is moved to the upstream side in the flow direction of the first liquid can be reduced. On the other hand, in a case where the flow rate R2 of the second liquid is set to be larger than the flow rate R1 of the first liquid, the amount of the second liquid that is moved to the upstream side in the flow direction of the first liquid can be increased.

<<Step (C)>>

In the step (C), the second liquid that is retained on the upstream side with respect to the combination point of the first liquid and the second liquid is moved by the first liquid in the flow direction of the first liquid, to a downstream side with respect to the combination point of the first liquid and the second liquid in the flow direction of the first liquid (see, for example, (b) of FIG. 4 to (d) of FIG. 4). Here, the term "retention" includes that the second liquid is apparently stationary and that the movement of the second liquid to the upstream side in the flow direction of the first liquid is delayed.

As illustrated in (b) of FIG. 4, the second liquid 2 that has been moved to the upstream side with respect to the combination point of the first liquid 1 and the second liquid 2 in the flow direction FD1 is retained on the upstream side with respect to the combination point of the first liquid 1 and the second liquid 2 in the flow direction FD1. It is conceived that the retention of the second liquid 2 is caused by, for example, the force received by the first liquid 1 that flows in the flow direction FD1.

As illustrated in (c) of FIG. 4, the retained second liquid 2 is moved to the downstream side in the flow direction FD1 by the first liquid 1. It is conceived that the movement of the second liquid 2 by the first liquid 1 is caused, for example, since the second liquid is retained to block the flow of the first liquid 1. Since the second liquid is retained to block the flow of the first liquid 1, the second liquid 2 is moved as if the second liquid 2 is pushed and caused to flow by the first liquid 1.

As illustrated in (d) of FIG. 4, the retained second liquid 2 is moved by the first liquid 1 to the downstream side with respect to the combination point of the first liquid 1 and the second liquid 2 in the flow direction FD1. As illustrated in (d) of FIG. 4, the second liquid 2 that has been moved to the downstream side in the flow direction FD1 flows in a state of being sandwiched by the first liquid 1 before and after the flow direction.

In the formation method for a slug flow according to the present disclosure, it is possible to form a slug flow in which the first liquid and the second liquid flow alternately, for example, by repeating the process as illustrated in (a) of FIG. 4 to (d) of FIG. 4.

<<Step (D)>>

The formation method for a slug flow according to the present disclosure preferably includes retaining the second liquid that has been moved to the upstream side with respect to the combination point of the first liquid and the second liquid in the flow direction of the first liquid, on the upstream side with respect to the combination point of the first liquid and the second liquid in the flow direction of the first liquid, and arranging the first liquid and the second liquid vertically in the direction of gravitational force (hereinafter, may be referred to as the step "D"). In a case where the formation method for a slug flow according to the present disclosure includes the step (D), it is possible to improve the slug flow forming property. In the present disclosure, "arranging the first liquid and the second liquid vertically in the direction of gravitational force" means that one of the first liquid and the second liquid is located on the upper side and the other of the first liquid and the second liquid is located on the lower side in a case where the first liquid and the second liquid are observed in the horizontal direction. For example, assuming that the flow direction FD1 illustrated in (b) of FIG. 4 is the direction of gravitational force, the first liquid 1 and the second liquid 2, which are arranged vertically in the direction of gravitational force, are illustrated in (b) of FIG. 4. In a case where the formation method for a slug flow according to the present disclosure includes the step (D), the step (D) is preferably carried out between the step (B) and the step (C).

<<Liquid Retention Method>>

In the formation method for a slug flow according to the present disclosure, it is possible to effectively retain the second liquid, for example, by using a device having the following retention part. In a case where the formation method for a slug flow according to the present disclosure is carried out using the above device (A), the formation method for a slug flow according to the present disclosure preferably includes retaining the second liquid at a retention part that is located inside the first pipe line and retains the second liquid that has been moved to the upstream side with respect to the combination point of the first liquid and the second liquid in the flow direction of the first liquid. In a case where the retention part is arranged in the first pipe line, the second liquid can be easily retained. Further, in a case where the second liquid is retained in the retention part, the amount of the second liquid retained on the upstream side with respect to the combination point of the first liquid and the second liquid in the flow direction of the first liquid can be stably adjusted, and thus the controllability of the slug length can be improved.

The retention part is not limited as long as it is a member that is capable of retaining the second liquid that has been moved to the upstream side with respect to the combination point of the first liquid and the second liquid in the flow direction of the first liquid. The retention part may be a member that is independent of the first pipe line. Further, the retention part may be a member that is composed of the first pipe line.

Hereinafter, the retention part will be described with reference to FIG. 5 to FIG. 8. FIG. 5 to FIG. 8 are each a schematic cross-sectional view illustrating an example of a retention part in the device that is used in the formation method for a slug flow according to the present disclosure.

In a certain embodiment, the retention part is preferably a reduced diameter part of which an inner diameter is reduced from the downstream side toward the upstream side in the flow direction of the first liquid. The reduced diameter part can delay the movement of the second liquid to the upstream side in the flow direction of the first liquid, and thus the second liquid can be easily retained.

In the reduced diameter part, it suffices that the inner diameter is reduced so that the cross-sectional area of the flow of the liquid that passes through the reduced diameter part is reduced. The inner diameter of the reduced diameter part may be linearly or non-linearly (for example, curvedly or stepwisely) reduced from the downstream side toward the upstream side in the flow direction of the first liquid.

The reduced diameter part may be formed by reducing the inner diameter of the first pipe line. Further, the reduced diameter part may be formed of a member that is independent of the first pipe line. In a case where the reduced diameter part is a member that is independent of the first pipe line, examples of the material of the reduced diameter part include a resin and a metal. Examples of the resin include the resins described above as the material of the first pipe line. Examples of the metal include the metals described above as the material of the first pipe line.

Figure 5:
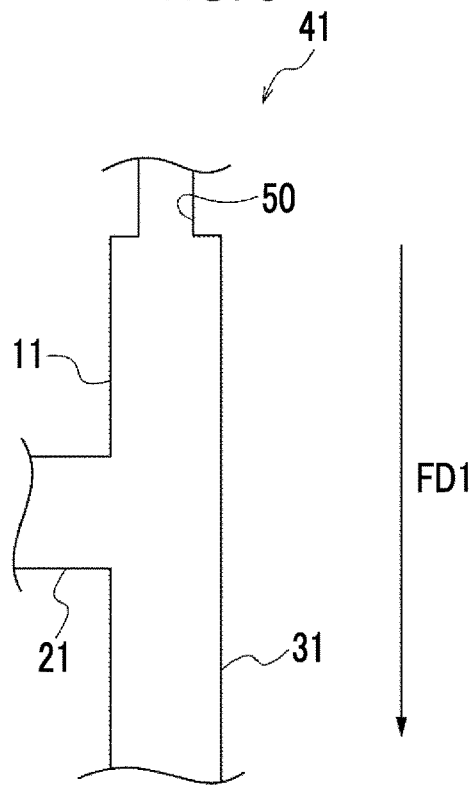
FIG. 5 is a schematic cross-sectional view illustrating an example of a retention part in the device that is used in the formation method for a slug flow according to the present disclosure.

For example, in the combination part 41 illustrated in FIG. 5, the first pipe line 11 through which the first liquid flows, the second pipe line 21 through which the second liquid flows, and third pipe line 31 through which the combined first liquid and second liquid communicate with each other. In the first pipe line 11, a reduced diameter part of which the inner diameter is reduced from the downstream side to the upstream side in the flow direction FD1 is provided as a retention part 50. In the retention part 50 illustrated in FIG. 5, the inner diameter of the first pipe line 11 is reduced on the upstream side in the flow direction of the first liquid.

In a certain embodiment, the retention part is preferably a reduced diameter part of which the inner diameter is reduced from the downstream side toward the upstream side in the flow direction of the first liquid and which is configured to adjust a distance L1 (hereinafter, may be simply referred to as a "distance L1") from the center of the combination part to the retention part. In the present disclosure, "the center of the combination part" means the intersection of the center line of the first pipe line and the center line of the second pipe line. In the present disclosure, "from the center of the combination part to the retention part" means from the center of the combination part to the end part of the retention part, which is located on the most downstream side in the flow direction of the first liquid. According to the reduced diameter part which is configured to adjust the distance L1 is capable of being adjusted, it is possible to adjust the slug length by adjusting the distance L1. For example, it is possible to shorten the slug length by shortening the distance L1 since the amount of the second liquid that is retained is reduced. In addition, it is possible to lengthen the slug length by lengthening the distance L1 since the amount of the second liquid that is retained is increased. Specifically, it is preferable that the retention part is an end part of a pipe line that is inserted into the first pipe line on the upstream side with respect to the combination point of the first liquid and the second liquid in the flow direction of the first liquid and has an inner diameter smaller than the inner diameter of the first pipe line. For example, in a case where the position of the end part of the pipe line inserted into the first pipe line is brought to be close to the center of the combination part, the distance L1 can be shortened. In addition, in a case where the position of the end part of the pipe line inserted into the first pipe line is brought to be spaced apart from the center of the combination part, the distance L1 can be lengthened. Examples of the material of the pipe line inserted into the first pipe line as the retention part include the material of the first pipe line described above.

Figure 6:
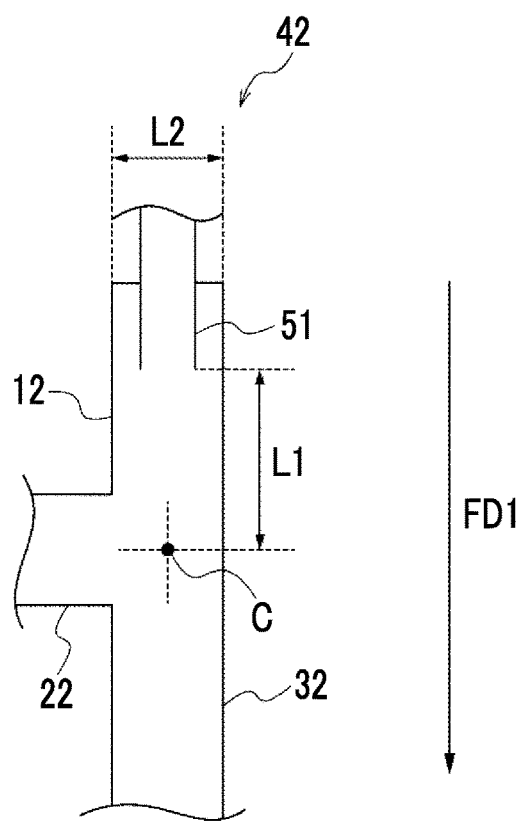
FIG. 6 is a schematic cross-sectional view illustrating an example of a retention part in the device that is used in the formation method for a slug flow according to the present disclosure.

For example, in the combination part 42 illustrated in FIG. 6, the first pipe line 12 through which the first liquid flows, the second pipe line 22 through which the second liquid flows, and third pipe line 32 through which the combined first liquid and second liquid communicate with each other. An end part of a pipe line that is inserted into the first pipe line 12 on the upstream side with respect to the combination point of the first liquid and the second liquid in the flow direction FD1 of the first liquid and has an inner diameter smaller than the inner diameter of the first pipe line is provided inside the first pipe line 12 as a retention part 51. In FIG. 6, it is possible to adjust the position of the retention part 51 by moving up and down the pipe line that is inserted into the first pipe line 12. In FIG. 6, C indicates the center of the combination part. In FIG. 6, L1 indicates the distance from the center C of the combination part to the retention part 51. In FIG. 6, L2 indicates the inner diameter of the first pipe line 12.

In a certain embodiment, the retention part is also preferably a constricted part having a partially reduced inner diameter. Here, "partially reduced inner diameter" means that the inner diameter of the constricted part is smaller than the inner diameter of each part that is present before and after the constricted part. The constricted part can delay the movement of the second liquid to the upstream side in the flow direction of the first liquid, and thus the second liquid can be easily retained.

In the constricted part, it suffices that the inner diameter is reduced so that the cross-sectional area of the flow of the liquid that passes through the constricted part is reduced.

The constricted part may be formed by partially constricting the first pipe line. Further, the constricted part may be formed of a member that is independent of the first pipe line. In a case where the constricted part is a member that is independent of the first pipe line, examples of the material of the constricted part include a resin and a metal. Examples of the resin include the resins described above as the material of the first pipe line. Examples of the metal include the metals described above as the material of the first pipe line.

Figure 7:
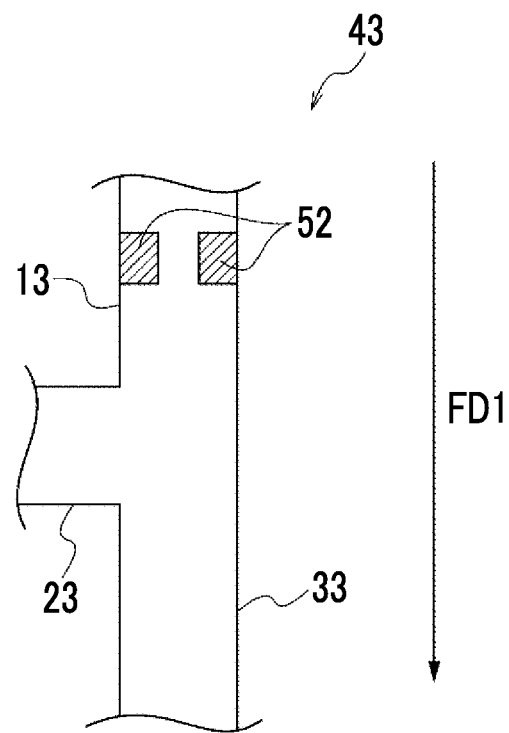
FIG. 7 is a schematic cross-sectional view illustrating an example of a retention part in the device that is used in the formation method for a slug flow according to the present disclosure.

For example, in the combination part 43 illustrated in FIG. 7, the first pipe line 13 through which the first liquid flows, the second pipe line 23 through which the second liquid flows, and third pipe line 33 through which the combined first liquid and second liquid communicate with each other. A constricted part having a partially reduced inner diameter is provided inside the first pipe line 13 as a retention part 52. The retention part 52 has a partially reduced inner diameter due to a structure that protrudes from the inner wall surface of the first pipe line 13 to the center.

In a certain embodiment, the retention part is also preferably a mesh-shaped member. The mesh-shaped member can delay the movement of the second liquid to the upstream side in the flow direction of the first liquid, and thus the second liquid can be easily retained. Examples of the material of the mesh-shaped member include a resin and a metal. Examples of the resin include the resins described above as the material of the first pipe line. Examples of the metal include the metals described above as the material of the first pipe line.

Figure 8:
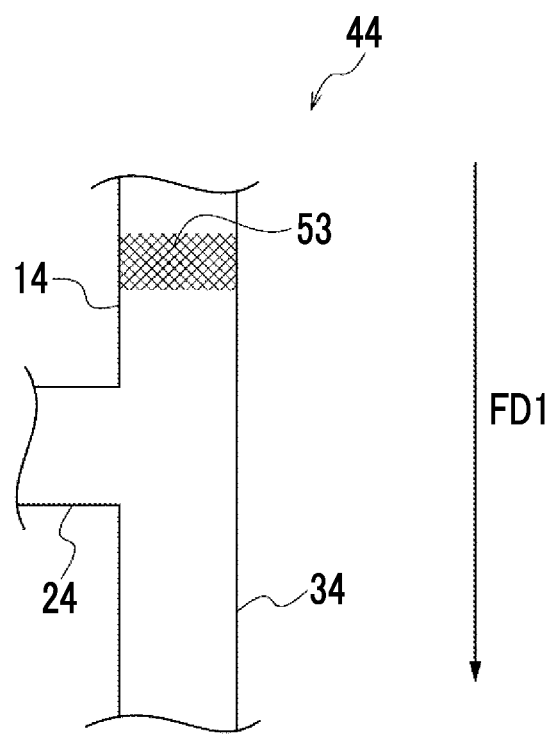
FIG. 8 is a schematic cross-sectional view illustrating an example of a retention part in the device that is used in the formation method for a slug flow according to the present disclosure.

For example, in the combination part 44 illustrated in FIG. 8, the first pipe line 14 through which the first liquid flows, the second pipe line 24 through which the second liquid flows, and third pipe line 34 through which the combined first liquid and second liquid communicate with each other. A mesh-shaped member is provided as a retention part 53 inside the first pipe line 14. The retention part 53 is provided so that the inside of the first pipe line 14 is blocked.

In a certain embodiment, the retention part may be a member having high affinity to the second liquid. The member having high affinity to the second liquid can delay the movement of the second liquid to the upstream side in the flow direction of the first liquid, and thus the second liquid can be easily retained. For example, it is possible to provide a retention part in the inside of the first pipe line by subjecting the inner wall of the first pipe line to surface treatment with a material having high affinity to the second liquid (for example, a hydrophobic material in a case where the second liquid is hydrophobic). Further, a material having high affinity to the second liquid may be used to carry out the surface treatment of the retention part such as the reduced diameter part described above.

The distance L1 from the center of the combination part to the retention part is preferably 1 mm or more, more preferably 2 mm or more, and particularly preferably 4 mm or more. In a case where the distance L1 is in the above range, it is possible to lengthen the slug length. The upper limit of the distance L1 is not limited and may be determined depending on the target slug length. The distance L1 may be determined, for example, in a range of 100 mm or less (preferably 10 mm or less).

It is preferable that the distance L1 from the center of the combination part to the retention part and the inner diameter L2 of the first pipe line satisfy a relationship of L1>L2. In a case where the distance L1 from the combination point of the first liquid and the second liquid to the retention part and the inner diameter L2 of the first pipe line satisfy the relationship of L1>L2, it is possible to lengthen the slug length. The inner diameter L2 of the first pipe line refers to the inner diameter of the first pipe line in the range from the center of the combination part to the retention part.

<<Example of Formation Method for Slug Flow According to Present Disclosure>>

Figure 9:
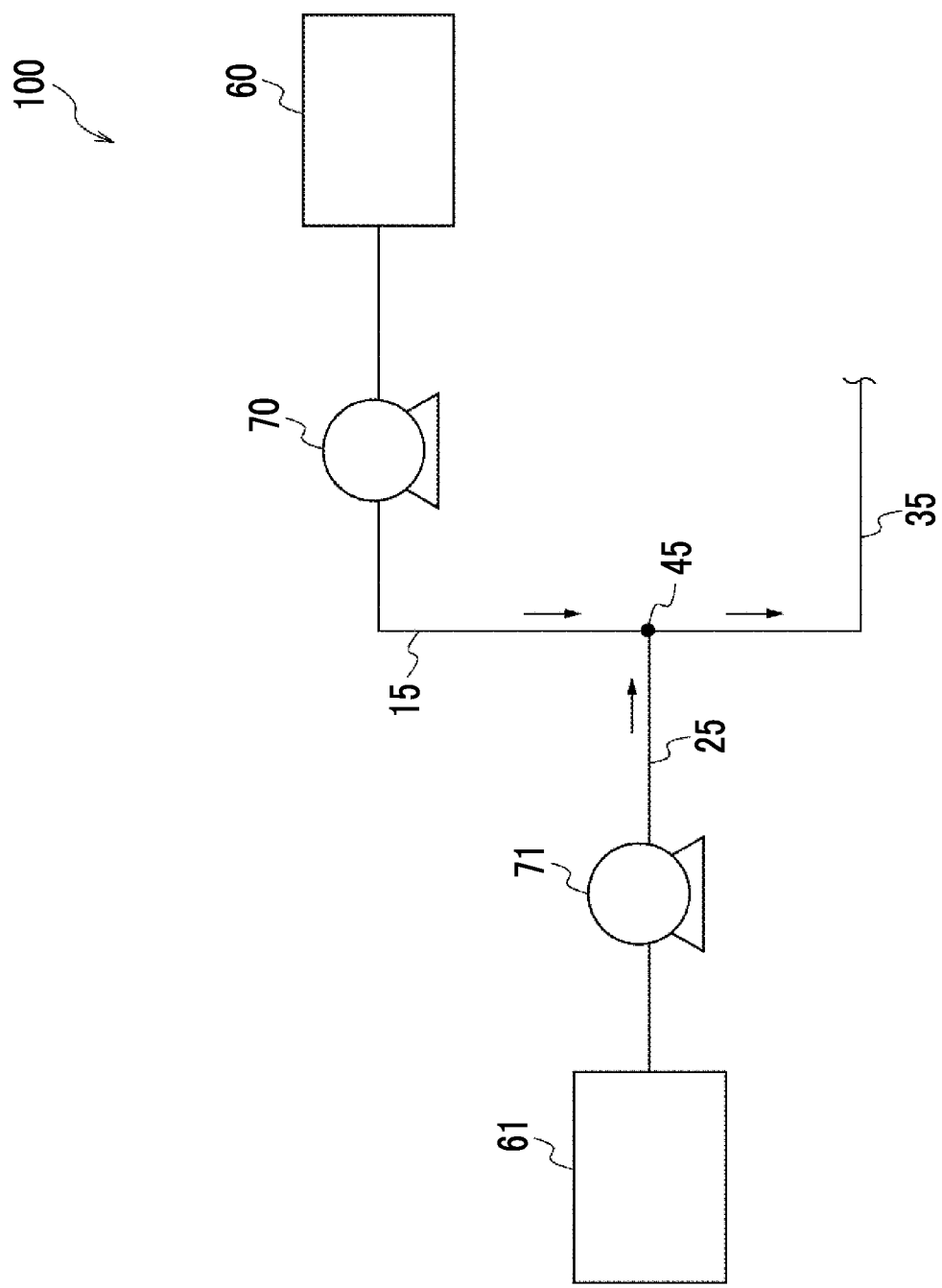
FIG. 9 is a schematic view illustrating an example of an overall configuration of the device that is used in the formation method for a slug flow according to the present disclosure.

Hereinafter, an example of the formation method for a slug flow according to the present disclosure will be described with reference to FIG. 9. FIG. 9 is a schematic view illustrating an example of an overall configuration of the device that is used in the formation method for a slug flow according to the present disclosure.

A device 100 illustrated in FIG. 9 includes a first pipe line 15, a second pipe line 25, a third pipe line 35, a combination part 45, a supply unit 60, a supply unit 61, a pump 70, and a pump 71. The device 100 is a device that is capable of forming a slug flow by combining the first liquid and the second liquid at the combination part 45. The device 100 is an example of the above-described device (A).

The combination part 45 is a portion at which the first pipe line 15 and the second pipe line 25 communicate with each other. At the combination part 45, the first pipe line 15, the second pipe line 25, and the third pipe line 35 are connected to each other.

The first pipe line 15 is a pipe line through which the first liquid flows. The second pipe line 25 and a third pipe line 35 are connected to one end part of the first pipe line 15.

The supply unit 60 is connected to the other end part of the first pipe line 15. The supply unit 60 is a device that stores the first liquid and supplies the first liquid to the combination part 45 via the first pipe line 15.

The pump 70 is provided in the middle of the first pipe line 15. The pump 70 is a device that supplies the first liquid stored in the supply unit 60 to the combination part 45.

The second pipe line 25 is a pipe line through which the second liquid flows. The first pipe line 15 and the third pipe line 35 are connected to one end part of the second pipe line 25.

The supply unit 61 is connected to the other end part of the second pipe line 25. The supply unit 61 is a device that stores the second liquid and supplies the second liquid to the combination part 45 via the second pipe line 25.

The pump 71 is provided in the middle of the second pipe line 25. The pump 71 is a device that supplies the second liquid stored in the supply unit 61 to the combination part 45.

The third pipe line 35 is a pipe line through which the combined first liquid and second liquid flow.

Next, an example of the formation method for a slug flow according to the present disclosure using the device 100 illustrated in FIG. 9 will be described with reference to FIG. 9.

In a case where the first liquid stored in the supply unit 60 is supplied to the combination part 45 and the second liquid stored in the supply unit 61 is supplied to the combination part 45, the first liquid supplied from the supply unit 60 to the combination part 45 and the second liquid supplied from the supply unit 61 to the combination part 45 are combined in the inside the combination part 45.

At the combination part 45, the first pipe line 15 and the second pipe line 25 communicate with each other so that the first liquid that flows along the direction of gravitational force and the second liquid that flows along the horizontal direction are combined. That is, at the combination part 45, the angle θ1 formed by the flow direction of the first liquid that is combined with the second liquid and the direction of gravitational force is adjusted to 0°. Further, at the combination part 45, the angle θ2 formed by the flow direction of the second liquid that is combined with the first liquid and the direction of gravitational force is adjusted to 90°.

The first liquid and second liquid, which are combined in the inside of the combination part 45, form a slug flow by repeating the process as illustrated in (a) of FIG. 4 to (d) of FIG. 4. Then, the slug flow that is formed in the inside of the combination part 45 is discharged via the third pipe line 35.

<< Use Application >>

The formation method for a slug flow according to the present disclosure can be applied to various use applications since the slug length can be easily adjusted. Examples of the use application of the formation method for a slug flow according to the present disclosure include an organic synthesis reaction, a particle formation reaction, and an extraction method.

The formation method for a slug flow according to the present disclosure is preferably used in an organic synthesis reaction. In the organic synthesis reaction, the slug flow that is formed by the formation method for a slug flow according to the present disclosure can be used as a reaction field. Examples of the organic synthesis reaction include polymerization (for example, emulsion polymerization) and an organic synthesis reaction using a phase transfer catalyst (for example, an alkylation reaction or an oxidation reaction).

The formation method for a slug flow according to the present disclosure is preferably used in a particle formation reaction. In the particle formation reaction, the slug flow that is formed by the formation method for a slug flow according to the present disclosure can be used as a reaction field. Examples of the particle formation reaction include a reaction in which organic particles or inorganic particles are formed. For example, in the reaction in which organic particles are formed, the above-described organic synthesis reaction (for example, emulsion polymerization) can be used. Further, the formation method for a slug flow according to the present disclosure may be used in a reaction in which pigment particles are formed.

The formation method for a slug flow according to the present disclosure is preferably used in an extraction method. In the extraction method, a component contained in one of the first liquid and the second liquid can be extracted into the other of the first liquid and the second liquid.

<Production Method for Organic Compound>

The production method for an organic compound according to the present disclosure includes the formation method for a slug flow according to the present disclosure. According to the production method for an organic compound according to the present disclosure, the slug length is capable of being adjusted by a simple method, and thus various organic synthesis reactions can be allowed to proceed using the slug flow as a reaction field.

Examples of the organic synthesis reaction include the organic synthesis reaction in the section of "Use application" described above. The conditions for the organic synthesis reaction are not limited, and known conditions can be applied.

Here, emulsion polymerization, which is an example of the organic synthesis reaction, will be described. In the emulsion polymerization, it is possible to allow the polymerization of a monomer to proceed, for example, by using a slug flow as a reaction field, where the slug flow is formed by combining the first liquid containing a polymerization initiator, an emulsifying agent, and water with the second liquid containing a monomer and an organic solvent (for example, a hydrocarbon). Examples of the monomer include styrene, an acrylate ester (for example, methyl acrylate), and a methacrylic acid ester (for example, methyl methacrylate). Polystyrene can be produced, for example, by carrying out emulsion polymerization of styrene as a monomer.

The organic compound obtained by the production method for an organic compound according to the present disclosure may be a low-molecular-weight compound or a high-molecular-weight compound.

<Production Method for Particles>

The production method for particles according to the present disclosure includes the formation method for a slug flow according to the present disclosure. According to the production method for particles according to the present disclosure, the slug length is capable of being adjusted by a simple method, and thus various particles can be produced using the slug flow as a reaction field.

In the production method for particles according to the present disclosure, organic particles can be produced, for example, by utilizing the above-described emulsion polymerization. Polystyrene particles can be produced, for example, by carrying out emulsion polymerization of styrene as a monomer.

The particles obtained by the production method for particles according to the present disclosure may be organic particles or inorganic particles. In addition, the particles may also be pigment particles.

<Extraction Method>

The extraction method according to the present disclosure includes the formation method for a slug flow according to the present disclosure. According to the extraction method according to the present disclosure, the slug length is capable of being adjusted by a simple method, and thus a component contained in the adjacent first liquid in the slug flow can be extracted into the second liquid. In addition, a component contained in the adjacent second liquid in the slug flow can be extracted into the first liquid.

Examples of the extraction method include a method of extracting a phenol component contained in dodecane (the second liquid) into the water phase (the first liquid).

EXAMPLES

Hereinafter, the present disclosure will be described in detail according to Examples; however, the present disclosure is not limited thereto.

<Configuration of Device>

Figure 10:
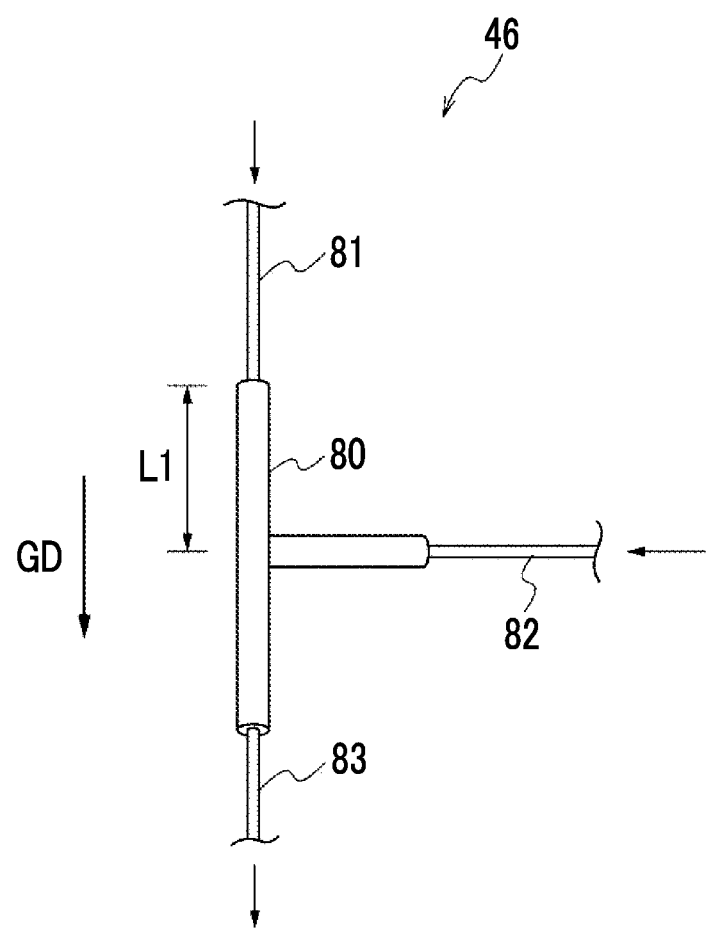
FIG. 10 is a schematic view illustrating a configuration of a combination part that is used in Examples and Comparative Examples.

In Examples and Comparative Examples, a device having a combination part having constitutional elements as illustrated in FIG. 10 was used. FIG. 10 is a schematic view illustrating a configuration of a combination part that is used in Examples and Comparative Examples.

In a combination part 46 illustrated in FIG. 10, each of a pipe 81, a pipe 82, and a pipe 83 is connected to a T-shaped pipe 80 (hereinafter, may be simply referred to as a "pipe 80") by a connecting member (not illustrated in the drawing).

A retention part (not illustrated in the drawing) is provided in the inside of the pipe 80. As the retention part, the following was applied; (1) a reduced diameter part formed at a connecting part between the pipe 80 and the pipe 81, which has a structure as illustrated in FIG. 5 (hereinafter, referred to as "1" in terms of the kind of retention part), or (2) an end part of the pipe 81 inserted into the pipe 80 (hereinafter, referred to as "2" in terms of the kind of retention part), which has a structure as illustrated in FIG. 6.

The liquid introduced into the pipe 80 via the pipe 81 and the liquid introduced into the pipe 80 via the pipe 82 can be combined in the inside of the pipe 80.

In FIG. 10, L1 indicates the distance from the center of the combination part to the retention part.

In FIG. 10, GD indicates the direction of gravitational force.

Example 1

Under the following conditions, a water phase (the first liquid) was introduced into the pipe 81, and an oil phase (the second liquid) was introduced into the pipe 82. The water phase and the oil phase were combined at the combination part 46 to form a slug flow.

Conditions

Kind of water phase: Water
Kind of oil phase: Styrene
Arrangement of combination part: Vertical
Kind of retention part: 1
Distance L1: 3.5 mm
Inner diameter of pipe 80: 2 mm
Outer diameter of pipe 81: 1.6 mm
Inner diameter of pipe 81: 1 mm
Flow rate (water phase): 1 mL/min
Flow rate (oil phase): 1 mL/min The "arrangement of combination part" under the above conditions will be described. That the arrangement of the combination part is "Vertical" means that the pipe 80 is arranged so that the liquid introduced into the pipe 80 via the pipe 81 flows inside the pipe 80 in the direction of gravitational force (the direction indicated by GD in FIG. 10). That is, the angle formed by the flow direction of the liquid introduced into the pipe 80 and the direction of gravitational force is 0°. On the other hand, the angle formed by the flow direction of the liquid introduced into the pipe 80 via the pipe 82 and the direction of gravitational force is 90°.

Examples 2 to 21 and Comparative Examples 1 to 3

A slug flow was formed by the same method as in Example 1 except that the conditions were changed according to the description in Table 1 to Table 3.

Example 20

A slug flow was formed by the same method as in Example 1 except that the conditions were changed according to the description in Table 3, the oil phase (fluorine oil, the first liquid) was introduced into the pipe 81, and the water phase (water, the second liquid) was introduced into the pipe 82.

Evaluation

[Controllability of Slug Length]

At a position 50 cm downstream of the connecting part between the pipe 80 and the pipe 83 (hereinafter, referred to as an "observation point"), each of the slug length of the water phase and the slug length of the oil phase in the slug flow that flowed inside the pipe 83 was measured at regular intervals (specifically, every 30 seconds). The slug length was measured by the visual observation using a ruler provided at the observation point. The controllability of the slug length was evaluated according to the following criteria based on the deviation of the slug length, calculated by repeating the measurement of the slug length ten times. The evaluation results are shown in Tables 1 to 3.

Criteria

A: The deviation of the slug length is within ±5%.
B: The deviation of the slug length is more than ±5%.

TABLE 1

|  | Example 1 | Example 2 | Example 3 | Example 4 | Comparative Example 1 | Comparative Example 2 |
| --- | --- | --- | --- | --- | --- | --- |
| Kind of water phase | Water | Water | Water | Water | Water | Water |
| Kind of oil phase | Styrene | Styrene | Styrene | Styrene | Styrene | Styrene |
| Density difference (water phase - oil phase) [kg/m$^3$] | 95 | 95 | 95 | 95 | 95 | 95 |
| Arrangement of combination part | Vertical | Vertical | Vertical | Vertical | Horizontal | Horizontal |
| Kind of retention part | 1 | 2 | 2 | 2 | 2 | 2 |
| Distance L1 [mm] | 3.5 | 1.5 | 3.5 | 1.5 | 3.5 | 1.5 |
| Inner diameter of pipe 80 [mm] | 2 | 2 | 2 | 2 | 2 | 2 |
| Outer diameter of pipe 81 [mm] | 1.6 | 1.6 | 1.6 | 1.6 | 1.6 | 1.6 |
| Inner diameter of pipe 81 [mm] | 1 | 1 | 1 | 1 | 1 | 1 |
| Flow rate (water phase) [mL/minute] | 1 | 1 | 0.1 | 0.1 | 1 | 1 |
| Flow rate (oil phase) [mL/minute] | 1 | 1 | 0.1 | 0.1 | 1 | 1 |

TABLE 1-continued

|  | Example 1 | Example 2 | Example 3 | Example 4 | Comparative Example 1 | Comparative Example 2 |
|---|---|---|---|---|---|---|
| Slug length (water phase) [mm] | 20 | 10 | 20 | 10 | ≤10 | ≤4 |
| Slug length (oil phase) [mm] | 20 | 10 | 20 | 10 | ≤10 | ≤4 |
| Controllability of slag length | A | A | A | A | B | B |

TABLE 2

|  | Example 5 | Example 6 | Example 7 | Example 8 | Example 9 | Example 10 | Example 11 | Example 12 |
|---|---|---|---|---|---|---|---|---|
| Kind of water phase | Water | Water | Water | Water | Water | Water | Water | Water |
| Kind of oil phase | Styrene | Styrene | Styrene | Styrene | Styrene | Styrene | Styrene | Styrene |
| Density difference (water phase - oil phase) [kg/m$^3$] | 95 | 95 | 95 | 95 | 95 | 95 | 95 | 95 |
| Arrangement of combination part | Vertical | Vertical | Vertical | Vertical | Vertical | Vertical | Vertical | Vertical |
| Kind of retention part | 1 | 2 | 1 | 2 | 1 | 2 | 1 | 2 |
| Distance L1 [mm] | 3.5 | 1.5 | 3.5 | 1.5 | 3.5 | 1.5 | 3.5 | 1.5 |
| Inner diameter of pipe 80 [mm] | 2 | 2 | 2 | 2 | 2 | 2 | 2 | 2 |
| Outer diameter of pipe 81 [mm] | 1.6 | 1.6 | 1.6 | 1.6 | 1.6 | 1.6 | 1.6 | 1.6 |
| Inner diameter of pipe 81 [mm] | 1 | 1 | 1 | 1 | 1 | 1 | 1 | 1 |
| Flow rate (water phase) [mL/minute] | 1.9 | 1.9 | 0.1 | 0.1 | 1.2 | 1.2 | 0.6 | 0.6 |
| Flow rate (oil phase) [mL/minute] | 0.1 | 0.1 | 1.9 | 1.9 | 0.6 | 0.6 | 1.2 | 1.2 |
| Slug length (water phase) [mm] | 95 | 57 | 5 | 3 | 60 | 30 | 30 | 15 |
| Slug length (oil phase) [mm] | 5 | 3 | 95 | 57 | 30 | 15 | 60 | 30 |
| Controllability of slag length | A | A | A | A | A | A | A | A |

TABLE 3

|  | Example 13 | Example 14 | Example 15 | Example 16 | Example 17 | Example 18 | Example 19 | Example 20 | Comparative Example 3 |
|---|---|---|---|---|---|---|---|---|---|
| Kind of water phase | Water | Water | Water | Water | Water | Water | Water | Water | Water |
| Kind of oil phase | Styrene | Toluene | Silicone oil (KF-96-0.65CS) | Cyclohexane | Dodecane | Silicone oil (KF-96-10CS) | Corn oil | Fluorine oil | Fluorine oil |
| Density difference (water phase - oil phase) [kg/m$^3$] | 95 | 140 | 240 | 220 | 250 | 60 | 90 | −430 | −430 |
| Viscosity (oil phase) [mPa · s] | 0.6 | 0.6 | 0.65 | 1.02 | 1.4 | 10 | 56 | 0.6 | 0.6 |
| Arrangement of combination part | Vertical | Vertical | Vertical | Vertical | Vertical | Vertical | Vertical | Vertical | Vertical |
| Kind of retention part | 1 | 1 | 1 | 1 | 1 | 1 | 1 | 1 | 1 |
| Distance L1 [mm] | 3.5 | 3.5 | 3.5 | 3.5 | 3.5 | 3.5 | 3.5 | 3.5 | 3.5 |

TABLE 3-continued

|  | Example 13 | Example 14 | Example 15 | Example 16 | Example 17 | Example 18 | Example 19 | Example 20 | Comparative Example 3 |
|---|---|---|---|---|---|---|---|---|---|
| Inner diameter of pipe 80 [mm] | 2 | 2 | 2 | 2 | 2 | 2 | 2 | 2 | 2 |
| Outer diameter of pipe 81 [mm] | 1.6 | 1.6 | 1.6 | 1.6 | 1.6 | 1.6 | 1.6 | 1.6 | 1.6 |
| Inner diameter of pipe 81 [mm] | 1 | 1 | 1 | 1 | 1 | 1 | 1 | 1 | 1 |
| Flow rate (water phase) [mL/minute] | 10 | 10 | 10 | 10 | 10 | 10 | 10 | 10 | 10 |
| Flow rate (oil phase) [mL/minute] | 10 | 10 | 10 | 10 | 10 | 10 | 10 | 10 | 10 |
| Slug length (water phase) [mm] | 20 | 20 | 20 | 20 | 20 | 20 | 20 | 20 | ≤5 |
| Slug length (oil phase) [mm] | 20 | 20 | 20 | 20 | 20 | 20 | 20 | 20 | ≤5 |
| Controllability of slag length | A | A | A | A | A | A | A | A | B |

In each of Tables, the dimensions of the pipe 82 and the dimensions of the pipe 83, illustrated in FIG. 10, are each the same as the dimensions of the pipe 81.

In each of Tables, the numerical value described in the column of "Density difference" indicates the difference between the density of the water phase and the density of the oil phase ([density of water phase]-[density of oil phase]). In a case where the numerical value described in the column of "Density difference" is a positive value, it means that the density of the water phase is larger than the density of the oil phase. In a case where the numerical value described in the column of "Density difference" is a negative value, it means that the density of the water phase is smaller than the density of the oil phase.

In each of Tables, in a case where the column of "Arrangement of combination part" is "Vertical", it means that the pipe 80 is arranged so that the liquid introduced into the pipe 80 via the pipe 81 flows inside the pipe 80 in the direction of gravitational force (the direction indicated by GD in FIG. 10). That is, the angle formed by the flow direction of the liquid introduced into the pipe 80 and the direction of gravitational force is 0°. On the other hand, the angle formed by the flow direction of the liquid introduced into the pipe 80 via the pipe 82 and the direction of gravitational force is 90°.

In each of Tables, in a case where the column of "Arrangement of combination part" is "Horizontal", it means that the pipe 80 is arranged at such a position that the first liquid and the second liquid are combined along the horizontal plane in the inside the pipe 80.

In each of Tables, in a case where the column of "Retention part" is "1", it means that the reduced diameter part formed at the connecting part between the pipe 80 and the pipe 81, which has the structure as illustrated in FIG. 5, is applied.

In each of Tables, in a case where the column of "Retention part" is "2", it means that the end part of the pipe 81 inserted into the pipe 80, which has the structure as illustrated in FIG. 6, is applied.

In each of Tables, "Inner diameter of pipe 80" corresponds to the inner diameter L2 of the first pipe line.

From Tables 1 to 3, it has been found that the deviation of the slug lengths of Examples 1 to 20 is small as compared with that of Comparative Examples 1 to 3. From the above results, it has been found that the controllability of the slug lengths of Examples 1 to 20 is high as compared with that of Comparative Examples 1 to 3.

The disclosure of JP2019-173323 filed on Sep. 24, 2019 is incorporated in the present specification by reference in its entirety. All documents, patent applications, and technical standards described in the present specification are herein incorporated by reference to the same extent that each individual document, patent application, or technical standard was specifically and individually indicated to be incorporated by reference.

What is claimed is:
1. A formation method for a slug flow, comprising:
combining a first liquid and a second liquid that is not compatible with the first liquid;
moving the second liquid that is combined with the first liquid to an upstream side with respect to a combination point of the first liquid and the second liquid in a flow direction of the first liquid;
moving, by the first liquid, the second liquid, which is retained on the upstream side with respect to the combination point of the first liquid and the second liquid in the flow direction of the first liquid, to a downstream side with respect to the combination point of the first liquid and the second liquid in the flow direction of the first liquid; and,
the retaining the second liquid, which has been moved to the upstream side with respect to the combination point of the first liquid and the second liquid in the flow direction of the first liquid, comprising arranging the first liquid and the second liquid vertically in the direction of gravity;
wherein a density D1 of the first liquid and a density D2 of the second liquid satisfy a relationship of D1>D2.
2. The formation method for a slug flow according to claim 1,
wherein at the combination point of the first liquid and the second liquid, an angle Θ1 between the flow direction of the first liquid that is combined with the second liquid and the direction of gravity and an angle $\Theta 2$ between a flow direction of the second liquid that is combined with the first liquid and the direction of gravity satisfy a relationship of $\Theta 1 < \Theta 6$.

3. The formation method for a slug flow according to claim 1,
wherein at the combination point of the first liquid and the second liquid, an angle $\Theta 1$ between the flow direction of the first liquid that is combined with the second liquid and a direction of gravity is 0° or more and less than 90°.

4. The formation method for a slug flow according to claim 1,
wherein the density D1 of the first liquid and the density D2 of the second liquid satisfy a relationship of 5 kg/m³<=D1−D2.

5. The formation method for a slug flow according to claim 1,
wherein a flow rate R1 of the first liquid and a flow rate R2 of the second liquid satisfy a relationship of R1>R2 or a relationship of R1<R2.

6. The formation method for a slug flow according to claim 1, further comprising combining the first liquid and the second liquid at a combination part of a device having;
a first pipe line through which the first liquid flows,
a second pipe line through which the second liquid flows,
the combination part at which the first pipe line and the second pipe line communicate with each other and the first liquid and the second liquid are combined, and
a third pipe line which is connected to the combination part and through which the combined first liquid and second liquid flow.

7. The formation method for a slug flow according to claim 6, further comprising retaining the second liquid at a retention part that is located inside the first pipe line and retains the second liquid that has been moved to the upstream side with respect to the combination point of the first liquid and the second liquid in the flow direction of the first liquid.

8. The formation method for a slug flow according to claim 7,
wherein the retention part is a reduced diameter part of which an inner diameter is reduced from the downstream side toward the upstream side in the flow direction of the first liquid.

9. The formation method for a slug flow according to claim 7,
wherein the retention part is a reduced diameter part of which an inner diameter is reduced from the downstream side toward the upstream side in the flow direction of the first liquid and which is configured to adjust a distance L1 from a center of the combination part to the retention part.

10. The formation method for a slug flow according to claim 7,
wherein the retention part is an end part of a pipe line that is inserted into the first pipe line on the upstream side with respect to the combination point of the first liquid and the second liquid in the flow direction of the first liquid and has an inner diameter smaller than an inner diameter of the first pipe line.

11. The formation method for a slug flow according to claim 7,
wherein the retention part is a mesh-shaped member.

12. The formation method for a slug flow according to claim 7,
wherein a distance L1 from a center of the combination part to the retention part is 1 mm or more.

13. The formation method for a slug flow according to claim 7,
wherein a distance L1 from a center of the combination part to the retention part and an inner diameter L2 of the first pipe line satisfy a relationship of L1>L2.

14. A production method for an organic compound, comprising forming a slug flow by the formation method for a slug flow according to claim 1, and reacting the first liquid with the second liquid using the slug flow as a reaction field to produce the organic compound.

15. A production method for particles, comprising forming a slug flow by the formation method for a slug flow according to claim 1, and reacting the first liquid with the second liquid using the slug flow as a reaction field to produce the particles.

* * * * *